United States Patent [19]

Martinello et al.

[11] Patent Number: 5,437,826
[45] Date of Patent: Aug. 1, 1995

[54] EXTRUSION METHOD

[75] Inventors: Luciano Martinello, Rovigo; Giancarlo Colombo, Milan, both of Italy

[73] Assignee: ICMA San Giorgio SPA, Italy

[21] Appl. No.: 190,462

[22] Filed: Feb. 2, 1994

[30] Foreign Application Priority Data

Feb. 5, 1993 [IT] Italy .................. MI93A0188

[51] Int. Cl.⁶ .................. B29B 7/84; B29C 47/76
[52] U.S. Cl. .................. 264/102; 264/148; 264/211; 264/211.23; 264/349; 366/85; 366/88; 425/203; 425/204
[58] Field of Search .......... 264/102, 211, 211.21, 264/211.23, 349, 148; 425/203, 204; 366/85, 88

[56] References Cited

U.S. PATENT DOCUMENTS

| | | |
|---|---|---|
| 3,376,603 | 4/1968 | Colombo . |
| 4,065,532 | 12/1977 | Wild et al. .................. 264/211 |
| 4,228,116 | 10/1980 | Colombo et al. . |
| 4,243,456 | 1/1981 | Cesano . |
| 4,243,629 | 1/1981 | Tramezzani .................. 264/211.21 |
| 4,246,150 | 1/1981 | Bower .................. 264/211 |
| 4,328,067 | 5/1982 | Cesano . |
| 4,474,473 | 10/1984 | Higuchi et al. . |
| 4,663,103 | 5/1987 | McCullough et al. . |
| 4,708,623 | 11/1987 | Aoki et al. . |
| 4,889,673 | 12/1989 | Takimoto .................. 264/349 |
| 4,897,233 | 1/1990 | Bier et al. . |
| 4,906,421 | 3/1990 | Plamthottam et al. . |
| 5,173,230 | 12/1992 | Colombo . |
| 5,198,170 | 3/1993 | Hawryiko .................. 425/204 |
| 5,265,955 | 11/1993 | Guggiari .................. 425/204 |
| 5,286,437 | 2/1994 | Severiens .................. 425/204 |

FOREIGN PATENT DOCUMENTS

| | | |
|---|---|---|
| 517911 | 10/1955 | Canada . |
| 0058101 | 8/1982 | European Pat. Off. . |
| 0118847 | 9/1984 | European Pat. Off. . |
| 0172436 | 2/1986 | European Pat. Off. . |
| 0292584 | 11/1988 | European Pat. Off. . |
| 0426619 | 5/1991 | European Pat. Off. ........ 264/211.23 |
| 1604396 | 9/1970 | Germany . |
| 3710418 | 9/1988 | Germany .................. 264/211.23 |
| 59-118438 | 9/1984 | Japan . |
| 3-247435 | 11/1991 | Japan .................. 264/211 |
| 1134436 | 11/1968 | United Kingdom .............. 264/211 |
| 937204 | 6/1982 | U.S.S.R. . |

OTHER PUBLICATIONS

Twin Screw Extruder—A Separate Breed, Martelli, SPE Journal, Jan. 1971—vol. 27, pp. 25–30.

*Primary Examiner*—Jeffery R. Thurlow
*Attorney, Agent, or Firm*—Wigman, Cohen, Leitner & Myers

[57] ABSTRACT

A method of extruding a substantially uniform polymer composition made up of polyvinylchloride, a stabilizing additive composition and at least one of two additional constituents, one of which is a mineral filler and the other of which is a normally liquid plasticizer for the polyvinylchloride; the method is achieved while avoiding use of compounded PVC as a starting material and includes the steps of: (I) providing an extruder; (II) operating the rotors of the extruder for essentially synchronous rotation in a common direction while maintaining in the extruder cavity a temperature sufficient to plasticize the polyvinylchloride; (III) feeding particulate polyvinylchloride and the additive composition without substantial premixing of the polyvinylchloride and the additive composition into the cavity at the first inlet (e.g. a conventional common hopper) provided near the drive end and adjacent a first conveying segment portion of the rotors; (IV) introducing at least one of the additional constituents through at least one second inlet provided downstream of the first inlet adjacent a rotor section downstream of the first conveying section and downstream of at least one kneading segment section; and thereafter (V) degassing the mixture and extruding it through the extrusion die end.

19 Claims, 2 Drawing Sheets

EXTRUSION METHOD

FIELD OF THE INVENTION

This invention generally concerns polymer processing and specifically the extrusion of polymer compositions on the basis of polyvinylchloride (PVC).

BACKGROUND OF THE INVENTION

The high resistance of PVC against combustion as well as its low price and favourable processing properties are among the main reasons why this polymer is still one of the most widely used plastics where an optimum balance of price, processing ease, high strength and resistance to microbial degradation is required, such as in weather-exposed construction elements including tubings, panels and the like products.

According to the state of the art PVC must be compounded with stabilizers before it can be used for the manufacture of finished or semifinished articles, such as by moulding methods that involve extrusion. As used herein, the term "compounding" refers to a separate processing step in which molten or thermally plasticized PVC (i.e. in a heated state) is mixed with at least one constituent containing a stabilizing additive so as to form an essentially uniform material which is solidified to form a product that can be sold to the processing industry, e.g. in the form of pellets or granules.

Obviously, compounding of PVC involves a considerable energy consumption and is a significant cost factor. However, previous attempts to avoid compounding have failed and it has been generally assumed that compounding is a sine-qua-non requirement of PVC production because otherwise the PVC constituent would undergo substantial decomposition upon extrusion.

SUMMARY OF THE INVENTION

Accordingly, it is a main object of the present invention to provide for a method of extruding PVC-based compositions to form typical semi-finished products, such as panels, that avoids the requirement of using a compounded PVC as the starting material. Another object of the invention is a method for continuous production of PVC panels (generally considered a semi-finished material) that does not require use of a compounded PVC starting material. A further object is a plant for extrusion of PVC-based composition that will operate satisfactorily and yield high-quality PVC-based products even though a substantially pure—i.e. uncompounded PVC is used as the starting material.

It has been found according to the invention that, contrary to the teachings of the art, the above objects and further advantages can be achieved by a method of extruding a substantially uniform polymer composition which, per each 100 parts of its weight, consists essentially of (A) about 20 to about 95 parts by weight of polyvinylchloride, (B) about 1 to about 12 parts by weight of a stabilizing additive composition and at least one of two additional constituents, one of which is (C) a mineral filler in an amount of up to about 70 parts by weight and the other of which is (D) a normally liquid plasticizer for said polyvinylchloride in an amount of up to 60 parts by weight.

The method according to the invention comprises the steps of: (I) providing an extruding device (also termed extruder herein) having: (i) an elongated cavity extending from a drive end to an extrusion die end of said device and including; (ii) a pair of essentially isomorphous elongated rotors matchingly fitting into the cavity and being arranged adjacent each other for mutually interpenetrating motion; each of the rotors having a length-diameter ratio in the range of from 24D to 36D and being formed of at least six consecutive rotor segments having at least three conveying segment portions as well as at least three kneading segment portions arranged in a longitudinal sequence of alternating conveying and kneading segment portions; (II) operating the rotors for essentially synchronous rotation in a common direction at a speed of at least about 10 rotations per minute while maintaining in the cavity, e.g. by conventional heating means commonly associated with an extruder, a temperature sufficient to plasticize the polyvinylchloride; (III) feeding particulate polyvinylchloride (A) (e.g. as a virgin material or as a regenerated product) and the additive composition (B) without substantial premixing of constituents (A,B) into the cavity at a first inlet (e.g. a conventional common hopper) provided near the drive end and adjacent a first conveying segment portion of the rotors; (IV) introducing at least one of constituents (C) and (D) through at least one second inlet provided downstream of said first inlet adjacent a rotor section downstream of said first conveying section and downstream of at least one kneading segment section; (V) degassing said mixture and extruding it through the extrusion die end.

Any conventional un-compounded polyvinylchloride of the type known to be suitable for production of compounded PVC can be used in the inventive method. Uncompounded particulate PVC is a commercial product and can be obtained from many industrial sources. The term "particulate" refers to any solid form of PVC including pulverulent as well as granular forms, such as pellets or beads. The lower and upper limits of 20 to 95 parts are believed to be critical insofar as below about 20 parts of PVC polymer the quality of the final product would not be acceptable while an amount of above 95 parts would not allow for significant amounts of constituents B as well as C and/or D and yield a product which would be too rigid as well as relatively expensive.

By the same token, commercially available compositions or mixtures known to be suitable for use PVC-stabilizing agents can be used in the inventive method. A minimum of about 1 part is believed to be critical since below that value no commercial stabilizer or stabilizer mixture would have a sufficient stabilizing effect. Above 12 parts per 100 parts of the total composition no additional stabilizing benefits are to be expected while other product properties might suffer.

It is believed to be an essential feature of the invention that both the PVC as well as the stabilizing additive composition are fed into the cavity without any significant premixing or pre-blending, e.g. by simply feeding metered amounts of both components A and B into a common hopper arranged near the drive end of the cavity. The term "drive end" refers to that end of the cavity at which the rotors are connected to the drive or drives.

The third constituent is a conventional mineral filler (C) and/or a plasticizer for PVC (D). The amount of filler and/or plasticizer depends upon the type of product to be produced: when an essentially rigid (or "hard") type PVC product is to be obtained, the composition contains no or very little plasticizer. If, on the other hand, a flexible (or "soft") PVC product is to be made, the composition will contain little or no mineral filler. Further, any product type intermediate between rigid and flexible PVC containing both filler and plasticizer can be extruded according to the invention without the need to use compounded PVC.

Here again, any prior art filler or filler composition, e.g. a mineral dust or powder such as typically calcium carbonate, and any normally liquid plasticizer, e.g. a high-boiling ester of an acid, such as typically terephthalic acid, and one or more alcohols such as typically butanol or octanol, can be used as well as any conventional mixture of such fillers and plasticizers.

For brevity, whenever the following specification refers to "parts" it is to be understood that this refers to "parts by weight" and that this is always based upon 100 parts by weight of the total composition consisting essentially of component A, B C and D. Minor amounts of further additives may be present, such as a pigment or dye, and/or other additives for specific purposes but are not generally preferred and will generally range from 0 to not more than about 5 parts, preferably less than 2 parts.

As will be explained in more detail below, the points of introducing constituents A, B, C and/or D of the PVC composition into the extruder are believed to be critical. Also, if very high amounts of filler are to be introduced, such as above about 60 parts, the filler must be introduced into the cavity at different points. In an analogous manner, plasticizer portions above about 20 should be introduced at a position downstream of the point of entry of the first plasticizer portion. When plasticizer portions of above about 40 parts are to be used, the point of introducing the third portion should be downstream of the point of introduction of the second plasticizer portion.

"Downstream" as used herein refers to a position along the length of the cavity which is closer to the extrusion end of the cavity then the reference point mentioned in conjunction with the phrase "downstream of".

Extruders for use in the present invention are commercially available for processing of thermoplastic polymer compositions and are generally referred to as "co-rotational". An example of a suitable co-rotational extruder is disclosed, e.g. in EP 0 426 619 incorporated herein by way of reference. The term "cavity" is used herein to refer to the enclosed inner space or "barrel" of the extruder. Such cavity, however is not normally cylindrical but has a cross-section similar to a horizontally positioned figure "8" for receiving two elongated and interpenetrating rotors.

The rotors are "interpenetrating" in the sense that a protrusion on one of the rotors at a given longitudinal and rotational position cooperates with a recess on the other rotor in the corresponding position so that, in general, the distance between the rotors remains substantially constant at any point between them along the length of the cavity. The use of rotors having both conveying as well as kneading segment portions is known per se and is explained in some detail in the above-mentioned EP 0 426 619.

Preferably, for use in the method of the invention, the rotors form (i) a first conveying segment section adjacent the drive end of the cavity; (ii) a first kneading section downstream of and adjacent to the first conveying segment section; (iii) a second conveying segment section downstream of and adjacent to the first kneading segment section; (iv) a second kneading segment section downstream of and adjacent to the second conveying segment section; (v) a third conveying section downstream of and adjacent to the second kneading segment section. Preferably, the rotors further have (vi) a third kneading segment section downstream of and adjacent the third conveying segment section and (vii) a fourth conveying segment section downstream of and adjacent to the third kneading segment section.

Generally, the fourth conveying segment section is positioned adjacent the extrusion end of the cavity, i.e. the end thereof that is provided with an extrusion nozzle of conventional construction depending upon the shape of the product produced.

If a filler is used in a substantial amount (as in many preferred embodiments of the invention) up to about 60 parts of filler constituent fed into the cavity through the second inlet located adjacent the second conveying segment portion of the rotors while any amount of above about 60 parts of the filler is fed through a further inlet provided downstream of the second inlet and adjacent the third conveying section. Generally, use of more than about 70 parts of filler does not yield a homogeneous product. As mentioned before, the filler is not a critical constituent if a flexible PVC product is to be made; a preferred lower limit of the amount of filler used is about 5 parts. Introduction of the filler is preferably effected by force-feeding means, e.g. a screw conveyor which feeds the filler through a laterally positioned opening into the extruder cavity.

In an analogous manner, the plasticizer is not a critical constituent if a rigid type PVC product is to be made. If plasticizer is to be added, use of a force-feeding device, such as a pump, is also preferred for introduction into the cavity. Up to about 20 parts plasticizer can be fed through a first conduit that opens into the cavity downstream of the first kneading segment portion. If more than 20 parts of plasticizer are to be used, any portion between about 20 to about 40 parts are fed into the cavity through a second conduit (which may be connected with the same pump as the first conduit) that opens into the cavity downstream of the opening of the first conduit; any further amount of up to about 60 parts of plasticizer is fed through a third conduit that opens into the cavity downstream of the opening of the second conduit and, again, the conduit may emanate from the same pump. More than about 60 parts plasticizer would yield a product that does not have the strength and coherence normally required of a commercially suitable PVC product. A preferred minimum amount of plasticizer is about 2 parts. As is known in the PVC-processing art, the plasticizing effect of a given plasticizer compound or plasticizer mixture may depend upon the molecular weight, molecular weight distribution and branching of the starting PVC used, and conventional criteria of selection such as the "K-value" (a viscosity-related parameter) can be used to select optimum amounts of a given plasticizer.

If both filler and plasticizer are to be used for producing a PVC product intermediate between "rigid" and "flexible" the filler is fed into the cavity through the second inlet while the plasticizer is fed into the cavity through an opening downstream of the second inlet.

As is conventional in PVC processing, a minor amount of a second polymer constituent such as a PVC-compatible (e.g. halogenated) polyethylene-based polymer can be added. If so, this constituent will be introduced into the cavity together with the particulate PVC, again without significant premixing.

A preferred application of the inventive method is continuous production of panels. Apart from using a non-compounded PVC and feeding the constituents of the final PVC composition into the cavity in the manner explained above, such panel production can follow established panel producing method, e.g. using a slit nozzle for extrusion of an endless web and cutting it into panel-sized portions.

A plant for continuous production of panels by extrusion of a PVC composition according to the invention without using or preparing a compounded PVC material as set forth above comprises a co-rotational extruder as explained above, a drive for the rotor, a slot die arranged near the extrusion end of the cavity for producing a continuous web of the extruded composition, and a means for cutting the web into panel-sized pieces. Generally, such a plant will also include suitable containers and means for continuously feeding metered amounts of constituents (A) and (B) without essential premixing into the first inlet and for force-feeding metered amounts of at least one of said constituents (C) and (D) into the second and any subsequent inlet.

BRIEF DESCRIPTION OF THE DRAWINGS

Preferred embodiments of the invention will be explained in more detail with reference to the enclosed drawings, in which.

DETAILED DESCRIPTION OF THE INVENTION

Figure 1:
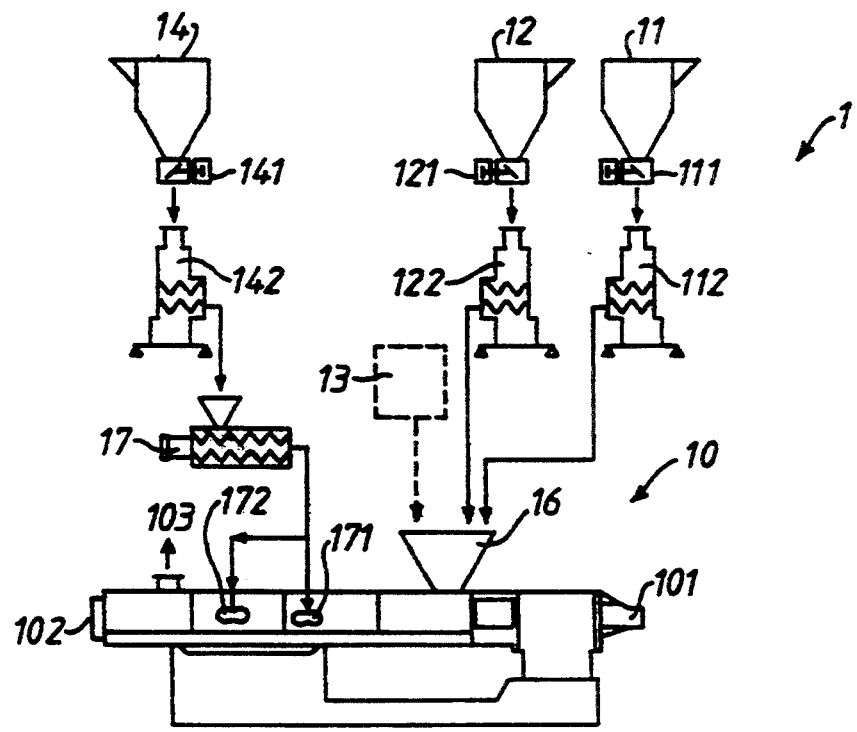
FIG. 1 is a diagrammatic side view of the process and apparatus elements when carrying a first embodiment of the invention.

Diagram 1 of FIG. 1 shows a co-rotational extruder 10 having a drive end 101 and an extrusion end 102 (drive and extrusion die not shown). A first container 11 containing particulate PVC (pure commercial grade, not compounded) is provided at its bottom with a controlled outlet 111 connected with a gravimetric metering device 112 for feeding a metered continuous stream of particulate PVC into hopper 16. A second container 12 contains the stabilizing additive composition and is provided via outlet 121 with a gravimetric metering device for feeding a metered stream of the stabilizing additive composition into hopper 16. No intentional mixing of PVC and the stabilizing additive is effected within hopper 16.

Optionally, a similar container and metering device for an impact modifier indicated in broken lines at 13 may be provided but this is not normally preferred.

A further container 14 is provided for the filler. Again, a controlled outlet 141 is provided at the lower end of container 14 and feeds the filler via a gravimetric metering device 142 into a screw-conveyer or similar force feeding device 17. The filler is forced into the cavity of the extruder at a lateral opening 171. If desired or required, the screw extruder can feed a portion of the filler into a second lateral opening 172.

A thermally plasticized uniform mixture of PVC, stabilizing additive and filler is produced within the cavity of extruder 10 and degassed via a conduit (not shown) that connects the degassing outlet 103 with a source of reduced pressure in a manner known per se. Finally, the uniform mixture is extruded via extrusion end 102 through a die (not shown).

Figure 2:
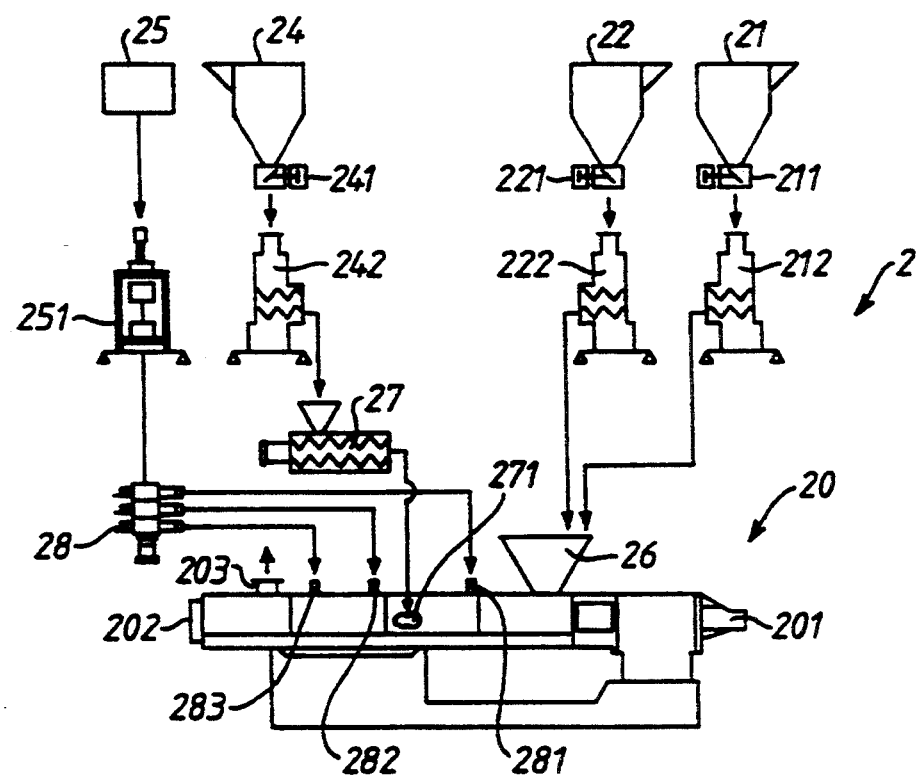
FIG. 2 is a diagrammatic view similar to that of FIG. 1 when carrying out another embodiment of the invention.

Diagram 2 of FIG. 2 shows a co-rotational extruder of similar construction as in FIG. 1. having a drive end 201 and extrusion end 202. Particulate PVC is fed into extruder 20 from a container 21 provided with a controlled outlet 211 via a gravimetric metering device 211 into hopper 26. Stabilizing additive composition is fed from container 22 via controlled outlet 221 into metering device 222 and from there into hopper 26. Again, no intentional mixing is effected in hopper 26.

Liquid plasticizer is fed from container 25 via a volumetric metering device to a pump 28 connected by three conduits with three inlets 281,282 and 283 mutually distanced from each other and each feeding a portion of the plasticizer into the extruder.

Optionally, filler is also fed into extruder 20 from another container 24 via another controlled outlet 241 and gravimetric metering device 242 into a conveying screw 27 which supplies the filler through a single lateral opening into the cavity of extruder 20. It is to be noted that the feeder inlet 271 is positioned downstream from the first inlet 281 for the plasticizer while both the second and the third inlet 282, 283 for the plasticizer are positioned downstream of filler inlet 271. While the position of the filler inlet 271 is assumed to be relatively critical for obtaining an optimum uniform distribution of the filler in the PVC composition, the location of the first plasticizer inlet 281 is less critical; positioning it upstream of the (only) filler inlet 271 is a preferred but not a critical feature for many purposes.

Figure 3:
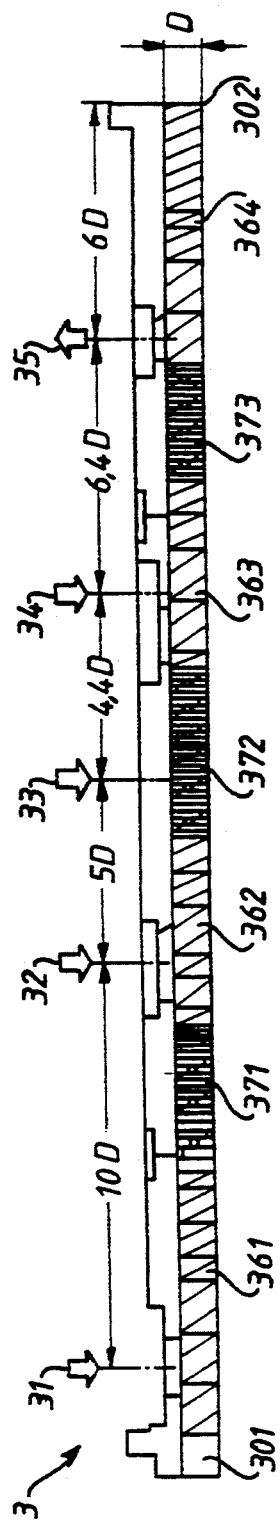
FIG. 3 is a semi-diagrammatic side view of the structure of one of the rotors of an extruding device for carrying out a preferred embodiment of the inventive method and FIG. 4 is a semi-diagrammatic partial side view of a plant for producing panels according to the invention.

FIG. 3 is a diagrammatical side view of one of the rotors 3 of a co-rotational extruder used in the present invention. Starting from the drive end 301 (encompassing cavity not shown) at the left side of rotor 3 there are four conveying sections 361, 362, 363 and 364 formed of conveying segments as illustrated in the above-mentioned European patent application and optionally having subsections of varying pitch. Positioned between two adjacent conveying segment sections are three kneading sections 371, 372, 373. As is known per se these kneading section have substantially no conveying effect which is provided only by the conveying sections. The kneading sections do what their name implies, namely "knead" the viscous mass within the cavity and contribute substantially to a thorough inter-mixing of the constituents of the composition.

Filler and stabilizer are fed into the cavity through inlet 31 adjacent drive end 301. After a passage length of ten diameters "D" and downstream of first kneading section 361 is the second opening 32 through which a portion at least of the filler is introduced as explained above. Adjacent the second kneading section 372 at the location of arrow 33 is a first opening (not shown) for feeding plasticizer. The distance between the filler inlet 32 and the (first) plasticizer inlet 33 is five diameters D. (The diameter D is generally assumed to be that of one rotor of the pair).

A second filler inlet 34 is located downstream of the (first) plasticizer inlet 33 and separated downstream therefrom by a distance of 4.4 diameters D. If required, a second and third plasticizer inlet (not shown) could be located downstream of the second filler inlet 34; the degassing outlet 35 is distanced from the second filler inlet by 6.4 diameters D while the distance between degassing outlet 35 and the extrusion end is six diameters. Accordingly, the total length of the screw is 31.8 diameters D. The difference between the length of the cavity and the length of rotor 3 is not normally a significant parameter and is normally kept at a minimum.

As is apparent from FIG. 3, a structure of this type can be used for producing both rigid and semi-rigid PVC compositions. If no filler is added and with a rotor structure as shown in FIG. 3, plasticizer would preferably be introduced at an opening distanced by 10.5 diameters downstream of the PVC-plus-stabilizer inlet while a second plasticizer inlet would be distanced by 8 diameters downstream form the first plasticizer inlet. The distance between the second plasticizer inlet and the degassing outlet would then amount to 7.2 diameters so that, again, the distance between the degassing outlet and the extrusion end could be six diameters again for a total of 31.8 diameters D. If a third inlet for plasticizer would be needed, the distances can be adapted correspondingly, i.e. by displacing the second inlet upstream towards the first plasticizer inlet and positioning the third inlet intermediate between the degassing outlet and the second plasticizer inlet.

Figure 4:
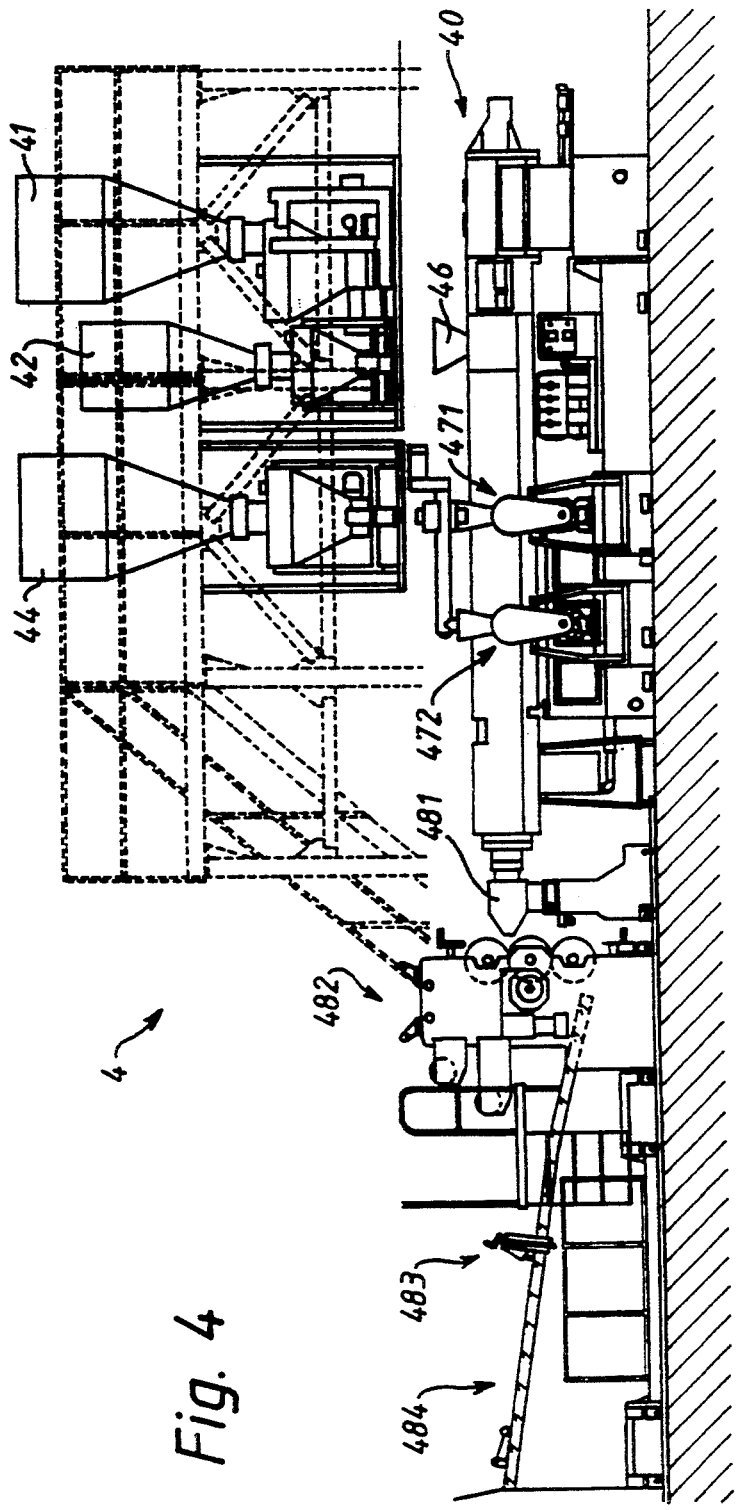

FIG. 4 shows a plant 4 for production of PVC panels according to the invention. Co-rotational extruder 40 is supplied with uncompounded PVC from container 41 and with stabilizer from container 42 via a common hopper 46. Container 44 feeds filler via screw conveyors 471, 472 into the extruder and the resulting PVC composition is extruded via a die 481 to a calender 482 to form a continuous web (not shown) which is cut into panels by a cutter 483. The panels are allowed to solidify on conveyor 484.

The following examples are given for illustration. All indications in parts are by weight.

EXAMPLE 1

The following composition was used for extruding a rigid-type PVC without a separate compounding step:

37.1 parts of uncompounded PVC resin powder; K-value 68 (supplied by EVC-Europe)

60.0 parts of calcium carbonate powder as filler (type Italomya; supplied by OMYA spa Milano)

1.5 parts of first stabilizer (barium-cadmium stabilizer (type R/27; supplied by REAGENS spa; Bologna)

0.5 parts of second stabilizer (lead sulphate) (supplied by REAGENS spa)

0.4 parts of first lubricant (Lubriol SV 400; supplied by REAGENS spa)

0.5 parts of second lubricant (wax OP 600; supplied by Hoechst AG, Germany).

PVC and all stabilizers and lubricants were fed continuously via containers 11,12 into hopper 16 of plant 1 of FIG. 1 without any pre-blending. The filler was introduced via container 14. Rigid type panels consisting of uniform PVC compostion were produced by extrusion.

EXAMPLE 2

Using a plant as shown in FIG. 2 the following "soft" or "flexible-type" PVC compostion was extruded to form uniform PVC sheeting:

66.7 parts of uncompounded PVC resin powder having a K-value of 70 (supplied by EVC-Europe)

30.0 parts of plasticizer DOP (supplied by Enichem, Italy)

1.0 parts of first stabilizer (lead sulphate; supplied by REAGENS spa)

0.7 parts of second stabilizer (lead dibasic stabilizer) (supplied by REAGENS spa)

1.0 parts of third stabilizer (lead tribasic stabilizer) (supplied by REAGENS spa)

0.2 parts of lubricant (GMS=glyceryl monostearate)

0.4 of impact modifier (type Paraloid K120/N; supplied by Rohm & Haas)

PVC was introduced via container 21, all stabilizers were introduced via container 22 and the impact modifier was introduced via a separate container (cf. FIG. 1, container 13), all feeding into hopper 26. The plasticizer was introduced from container via pump 28 through inlets 281, 282, 283).

It is to be noted that the above-mentioned components are well known in the PVC-processing art and numereous conventional alternatives, both with regard to the components as well as with regard to their relative amounts, can be used for the invention within the composition ranges and processing conditions as specified in the subsequent claims.

Accordingly, what we claim is:

1. A method of extruding a substantially uniform polymer composition which, per each 100 parts of its weight, consists essentially of (A) about 20 to about 95 parts by weight of uncompounded particulate polyvinylchloride, (B) about 1 to about 12 parts of weight of a stabilizing additive composition and at least one of two additional constituents, one of which is (C) a mineral filler in an amount of up to about 70 parts by weight and the other of which is (D) a normally liquid plasticizer for said polyvinylchloride in an amount of up to 60 parts by weight; said method comprising the steps of:

(I) providing an extruding device having
  (i) an elongated cavity extending from a drive end to an extrusion die end of said device including
  (ii) a pair of essentially isomorphous elongated rotors matchingly fitting into said cavity and being arranged adjacent each other for mutually interpenetrating motion; each of said rotors having a length-diameter ratio in the range of from 24D to 36D and being formed of at least six conservative rotor segments having at least three conveying segment portions as well as at least three kneading segment portions arranged in a longitudinal sequence of alternating conveying and kneading segment portions;

(II) operating said rotors for essentially synchronous rotation in a common direction at a speed of at least about 10 rotations per minute while maintaining within said cavity a temperature sufficient to plasticize said polyvinylchloride;

(III) feeding uncompounded particulate polyvinylchloride (A) and said additive composition (B) as separate components without substantial premixing of said constituents (A,B) into said cavity at a first inlet provided near said drive end and adjacent a first conveying segment portion of said rotors;

(IV) introducing at least one of said constituents (C) and (D) through at least one second inlet provided downstream of said first inlet and adjacent a rotor section downstream of said first conveying section and downstream of at least one kneading segment section thereby forming a mixture; and thereafter (V) degassing said mixture and extruding it through said extrusion die end.

2. The method of claim 1 wherein said rotors form (i) a first conveying segment section adjacent said drive end of said cavity; (ii) a first kneading section downstream of and adjacent to said first conveying segment section; (iii) a second conveying segment section downstream of and adjacent to said first kneading segment section; (iv) a second kneading segment section downstream of an adjacent to said second conveying segment section; (v) a third conveying section downstream of and adjacent to said second kneading segment section.

3. The method of claim 2 wherein said rotors form (vi) a third kneading segment section downstream of and adjacent said third conveying segment section and (vii) a fourth conveying segment section downstream of and adjacent to said third kneading segment section.

4. The method of claim 3 wherein said fourth conveying segment section is positioned adjacent said extrusion end of said cavity.

5. The method of claim 1 wherein up to about 60 parts by weight of said filler constituent (C) per 100 parts by weight of said composition are fed into said cavity through said second inlet adjacent a second conveying segment portion of said rotors.

6. The method of claim 5 wherein any amount of above about 60 parts by weight of said filler constituent (C) per 100 parts by weight of said composition is fed through a further inlet provided downstream of said second inlet and adjacent a third conveying section of said rotors.

7. The method of claim 5 wherein a portion, at least, of said filler constituent (C) is introduced through a laterally arranged second inlet.

8. The method of claim 7 wherein said filler constituent (C) is introduced by means of a force-feeding device.

9. The method of claim 2 wherein said plasticizer constituent (D) is fed into said cavity by means of a pump.

10. The method of claim 9 wherein up to about 20 parts by weight of said plasticizer constituent (D) per 100 parts by weight of said composition are fed into said cavity through a first conduit that opens into said cavity downstream of said first kneading segment portion.

11. The method of claim 9 wherein between about 20 to about 40 parts by weight of said plasticizer constituent (D) per 100 parts by weight of said composition are fed into said cavity through a second conduit that opens into said cavity downstream of said opening of said first conduit.

12. The method of claim 9 wherein about 40 to about 60 parts by weight of said plasticizer constituent (D) per 100 parts by weight of said composition are fed into said cavity through a third conduit that opens into said cavity downstream of said opening of said second conduit.

13. The method of claim 1 wherein said filler constituent (C) is added in an amount of from about 5 parts by weight to about 60 parts by weight per 100 parts by weight of said composition.

14. The method of claim 1 wherein said plasticizer constituent (D) is added in an amount of at least about 2 parts by weight per 100 parts by weight of said composition.

15. The method according to claim 1 wherein the extruded composition forms a flexible type PVC product and contains, per 100 parts by weight, not more than about 5 parts by weight of said filler constituent (C).

16. The method according to claim 1 wherein the extruded composition forms a rigid type PVC product and contains, per 100 parts by weight, not more than about 5 parts by weight of said plasticizer constituent (D).

17. The method according to claim I wherein the extruded composition forms a PVC product of a type intermediate between a rigid type PVC product and a flexible type PVC product and wherein said filler constituent (C) is fed into said cavity through said second inlet while said plasticizer constituent (D) is fed into said cavity through an opening downstream of said second inlet.

18. The method of claim 17 wherein a portion of said filler constituent (C) is fed into said cavity through an inlet downstream of said opening where said plasticizer constituent (D) is fed into said cavity.

19. A process for continuous production of panels comprising extruding a substantially uniform polymer composition which, per each 100 parts of its weight, consists essentially of (A) about 20 to about 95 parts by weight of uncompounded particulate polyvinylchloride, (B) about 1 to about 12 parts by weight of a stabilizing additive composition and at least one of two additional constituents, one of which is (C) a mineral filler in an amount of up to about 70 parts by weight and the other of which is (D) a normally liquid plasticizer for said polyvinylchloride in an amount of up to 60 parts by weight; said method comprising the steps of:

(I) providing an extruding device having
  (i) an elongated cavity extending from a drive end to an extrusion die end of said device including
  (ii) a pair of essentially isomorphous elongated rotors matchingly fitting into said cavity and being arranged adjacent each other for mutually interpenetrating motion; each of said rotors having a length-diameter ratio in the range of from 24D to 36D and being formed of at least six consecutive rotor segments having at least three conveying segment portions as well as at least three kneading segment portions arranged in a longitudinal sequence of alternating conveying and kneading segment portions;

(II) operating said rotors for essentially synchronous rotation in a common direction at a speed of at least about 10 rotations per minute while maintaining within said cavity a temperature sufficient to plasticize said polyvinylchloride;

(III) feeding uncompounded particulate polyvinylchloride (A) and said additive composition (B) as separate components without substantial premixing of said constituents (A,B) into said cavity at a first inlet provided near said drive end and adjacent a first conveying segment portion of said rotors;

(IV) introducing at least one of said constituents (C) and (D) through at least one second inlet provided downstream of said first inlet and adjacent a rotor section downstream of said first conveying section and downstream of at least one kneading segment section, thereby forming a mixture; thereafter (V) degassing said mixture and extruding it through said extrusion die end; and (VI) forming panels of said extruded mixture.

* * * * *